United States Patent

Riley

[11] 4,309,988
[45] Jan. 12, 1982

[54] ROOF ASSEMBLY

[75] Inventor: H. John Riley, Wembley, Australia

[73] Assignee: S. W. Hart & Co. Pty. Ltd., Welshpool, Australia

[21] Appl. No.: 118,950

[22] Filed: Feb. 6, 1980

[30] Foreign Application Priority Data

Apr. 27, 1979 [AU] Australia .............................. PD 8555

[51] Int. Cl.³ .......................... F24J 3/02; E04D 13/00
[52] U.S. Cl. .................................... 126/450; 126/431; 52/12
[58] Field of Search ..................... 126/450, 431; 52/12, 52/52, 53, 54, 57

[56] References Cited

U.S. PATENT DOCUMENTS 3,381,426  5/1968  Heidrich ................................ 52/57
4,215,675  8/1980  Embree ............................... 126/450

*Primary Examiner*—Samuel Scott
*Assistant Examiner*—G. Anderson
*Attorney, Agent, or Firm*—Pollock, Vande Sande & Priddy

[57] ABSTRACT

The invention relates to a roof assembly mounted on a sloping roofing structure, which comprises at least two parallel longitudinal flashing members extending down the slope and mounted on the roofing structure, each longitudinal flashing member comprising an elongated base having an upstanding wall member extending along each major side and each upstanding wall member having a resilient portion at its end remote from the base, at least one solar energy collector mounted on a pair of the longitudinal flashing members, said solar energy collector being generally rectangular in horizontal section and having a downwardly facing groove formed in each of at least two sides, each groove being engaged with a resilient portion of a wall member of a longitudinal flashing member such that the solar collector is clipped in place in the roof assembly.

In the roof assembly of the present invention the solar energy collectors can form part of the water proof membrane and the assembly can be mounted on standard type roofing structures such as purlins and trusses.

8 Claims, 6 Drawing Figures

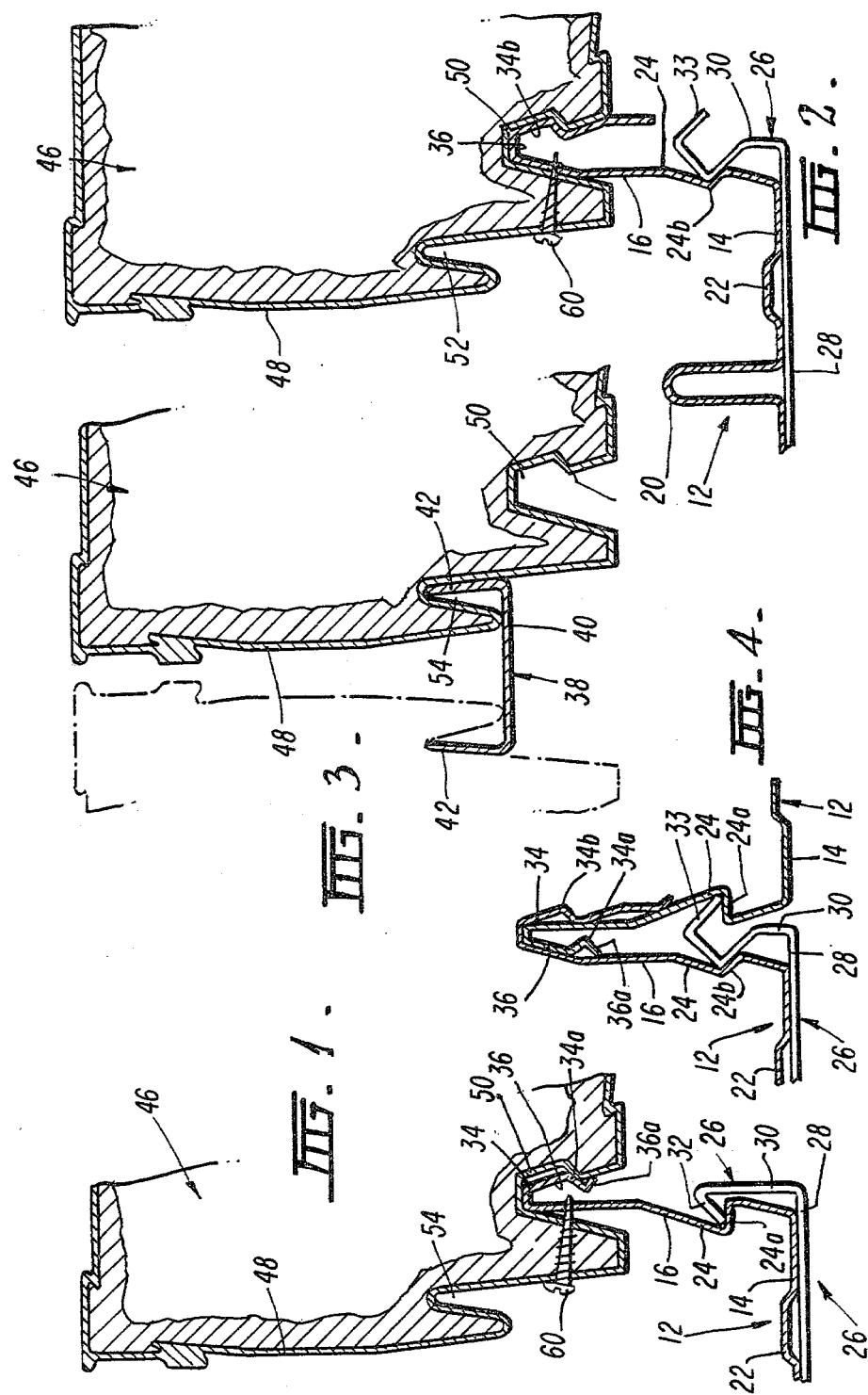

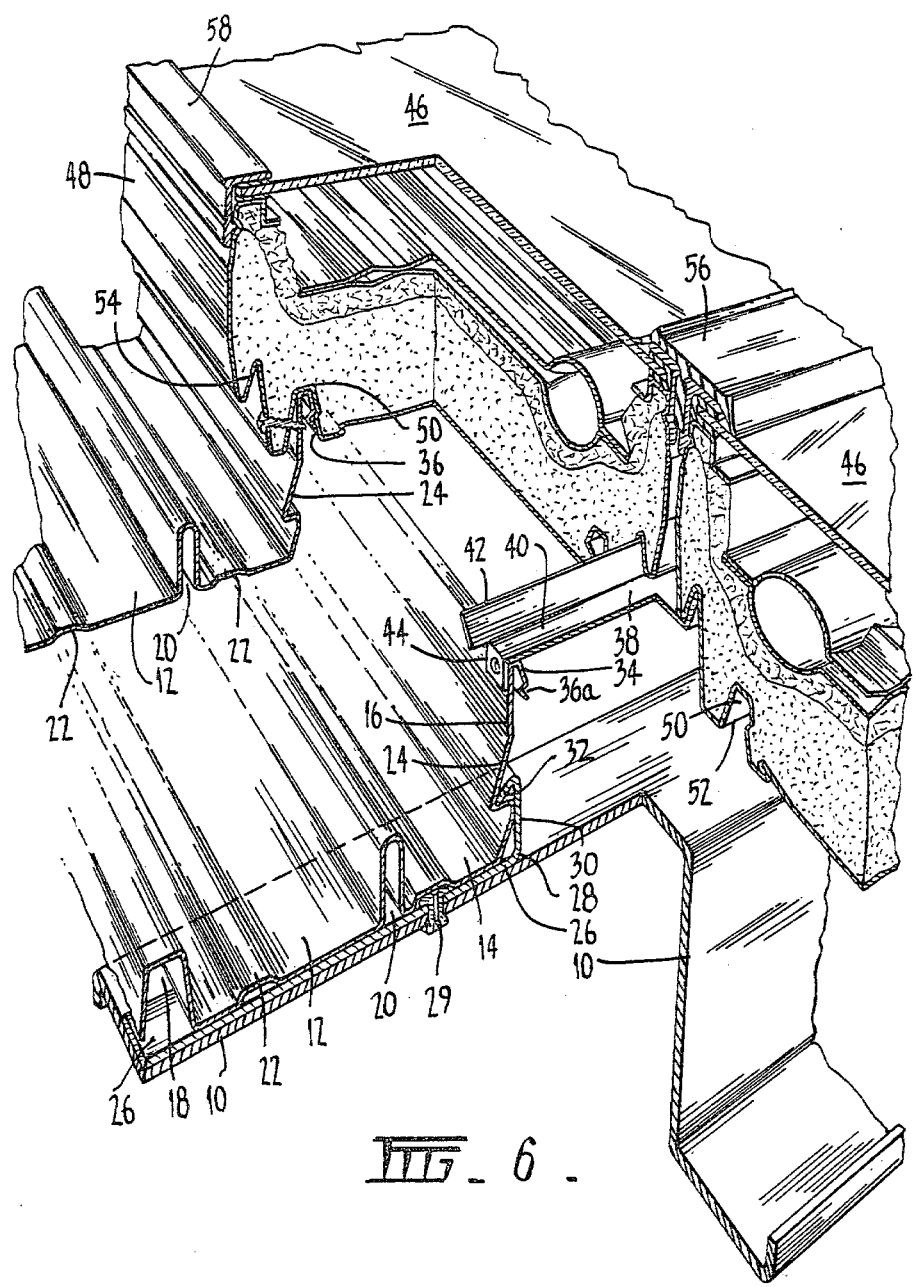
FIG_6.

ROOF ASSEMBLY

The present invention relates to a roof assembly in which a plurality of solar energy collectors are mounted on a roof and form part of the water-proof membrane.

Particularly, for industrial applications, it would be desirable to be able to mount solar energy collectors in such a way that they form part of the water-proof membrane. However, in such an arrangement it is necessary that each collector be accessible for servicing purposes. Also the pipe connections to the collectors are preferably above the water-proof membrane so that any leakage or accidental spillage from the collector circuit runs external to the building. Preferably, it should be possible to reglaze a collector in position without major disturbance to adjoining collectors and each collector should be removable for repair or replacement without major disturbance to adjoining collectors.

Further, the arrangement should conveniently be suitable for standard type roofing structures such as purlins and trusses. The present invention provides a roofing assembly in which a plurality of solar energy collectors are mounted on a roof in a way which meets one or more of the above requirements.

In accordance with the present invention there is provided a roof assembly mounted on a sloping roofing structure, which comprises at least two parallel longitudinal flashing members extending down the slope and mounted on the roofing structure, each longitudinal flashing member comprising an elongated base having an upstanding wall member extending along each major side and each upstanding wall member having a resilient portion at its end remote from the base, at least one solar energy collector mounted on a pair of the longitudinal flashing members, said solar energy collector being generally rectangular in horizontal section and having a downwardly facing groove formed in each of at least two sides, each groove being engaged with a resilient portion of a wall member of a longitudinal flashing member such that the solar collector is clipped in place in the roof assembly.

Preferably, there is also provided a plurality of transversely extending U-shaped flashing members mounted parallel to one another between adjacent longitudinal flashing members with a spacing corresponding to the longitudinal dimension of the or each solar collector. The U-shaped members are so mounted as to cause any water in them to run into the longitudinal flashing members to which they are connected.

Conveniently, the or each solar collector is provided with downwardly facing locating recesses on its transverse sides, which recesses engage with a respective leg of a U-shaped flashing member.

The present invention will now be described, by way of example, with reference to the accompanying drawings, in which:

FIG. 1 is a cross-section through an edge of a solar collector showing its mounting on a male edge of a longitudinal flashing member;

FIG. 2 is a view similar to FIG. 1 showing the mounting of the solar collector on a female end of a longitudinal flashing member;

FIG. 3 is a cross-section through an edge of a solar collector showing its mounting on a transverse flashing member;

FIG. 4 shows a pair of longitudinal flashing members in section clipped together;

FIG. 6 is a partially broken away upper perspective view of the roof asembly of FIG. 5.

Figure 5:
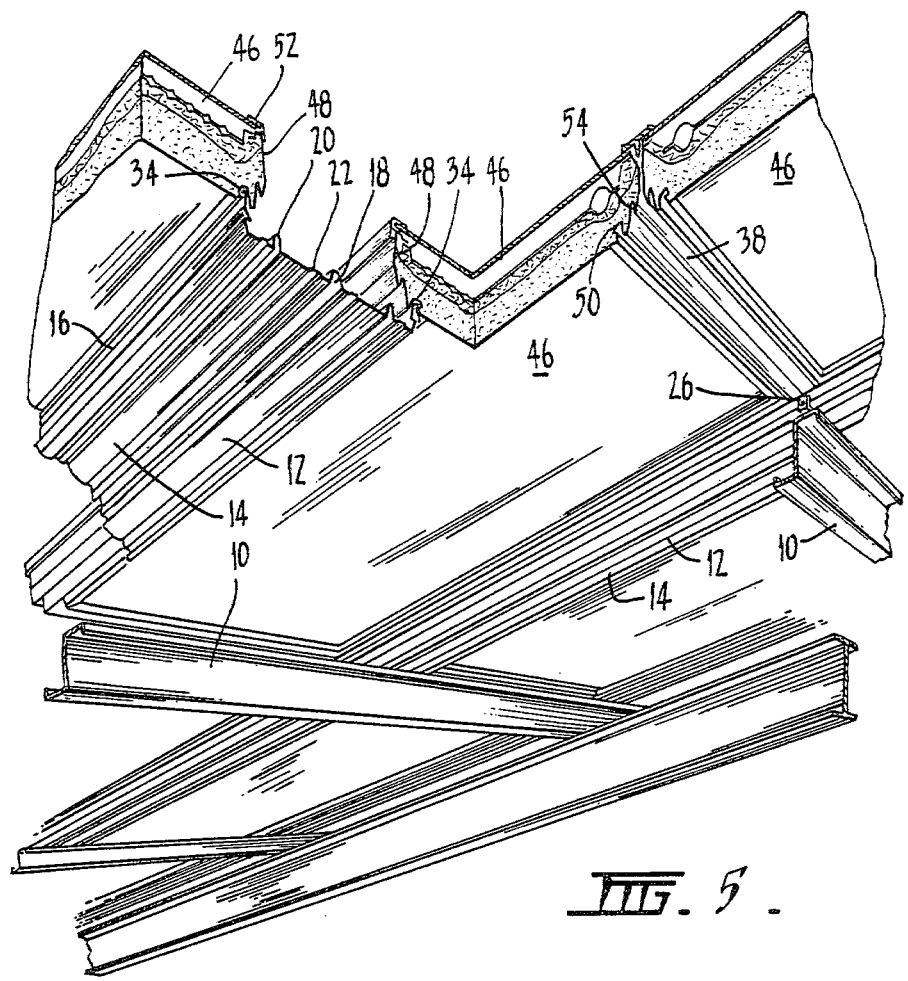
FIG. 5 is a partially broken away underneath perspective view of a roof assembly in accordance with the present invention.

In the drawings, there is shown a roof assembly mounted on a plurality of parallel transversely extending roof purlins 10. The roof assembly comprises a plurality of longitudinal flashing members 12 which extend down the slope of the roof parallel to one another and at right angles to the purlins 10. Each longitudinal flashing member 12 comprises an elongated base 14 having an upstanding wall member 16 extending along each of its major sides.

The base 14 comprises an elongated longitudinally extended angular projection 18 located mid-way between the wall members 16. The projection 18 is used firstly as a means of connecting the flashing member 12 to the purlins 10 by means of elongated bolts and cooperating nuts (not shown). Secondly, it is used as a mounting point for anchor straps, as will be described more fully hereinafter, which are required in cyclonic locations.

The base 14 also comprises a pair of round topped projections 20 which also extend longitudinally and are located on either side of the projection 18. The projections 20 are provided to make the flashing members 12 compatible with other roofing systems of known type where a portion of the roof is covered by another roofing system. Thus, where the roof assembly of the present invention terminates, the projections 20 enable it to be readily joined with the other roofing system.

Further, the base 14 also comprises a number of low ridges 22 which extend longitudinally parallel to the projections 18 and 20. The ridges 22 are provided to provide clearance for fixing members such as screws mounted in the purlins 10. Each wall member 16 runs the entire length of the base 14 and comprises an indentation 24 running longitudinally along its length. The indentation 24 cooperates with fixing clips 26 mounted on the purlins 10. Each fixing clip comprises a base portion 28 which rests on the purlin 10 and is secured thereto by screw means 29, and an upright portion 30 extending at right angles to the base portion 28. The upright portion 30 terminates in a portion which engages with the indentation 24 of the wall member 16. In this way the flashing members 12 are laterally secured to the purlins 10.

Each wall member 16 terminates at its free end remote from the base 14 in an outwardly extending resilient portion 34. Each resilient portion 34 extends the length of its respective wall member 16 and is of a shape such that it can resiliently engage with a groove in a solar energy collector to be described hereinafter, in such a way that the collector is clipped in place in the roof assembly. In the embodiment shown the resilient portion 34 terminates in a downturned portion 36 including a longitudinal V-section notch 36a.

As can be seen in FIGS. 1 and 2, each longitudinal flashing member 12 is preferably asymetrical in its wall members 16. Thus, one wall member 16 terminates in a male resilient portion 34a as shown in FIG. 1 while the other wall member 16 terminates in a female resilient portion 34b as shown in FIG. 2. Each male and female resilient portion is engageable with the groove in the solar energy collector as will be described hereinafter. However, as can be seen in FIG. 4, the male resilient portion 34a is engageable within the female resilient portion 34b. Thus, the longitudinal flashing members can be clipped in side by side relationship to complete the roof decking in areas where it is not desired to mount solar collectors.

The wall member 16 with the male resilient portion 34b contains an indentation 24a which describes a relatively small angle compared to the indentation 24b in the wall member 16 with the female resilient portion 34b.

The upright portions 30 of the fixing clips 26 either terminate in an inturned lip 32 (see FIG. 1) to engage with an indentation 24a or in a channel portion 33 (see FIG. 2) to engage with an indentation 24b. Further, the channel portion 33 is so arranged that when longitudinal flashing members 12 are clipped together as shown in FIG. 4, the outer extremity of the channel portion 33 also engages with the indentation 24a of the wall member 16 with the male resilient portion 34a. In addition to the longitudinal flashing members 12 the roof assembly includes a plurality of transversely extending U-shaped flashing members 38 each comprising an elongated base 40 and leg members 42 extending from each long side of the base 40 (see FIG. 3). At each end the base 40 is provided with a downwardly turned flap 44 (see FIG. 6) by which the U-shaped flashing member 38 is secured to an upper region of the adjacent wall 16 such as by pop rivetting. The flashing members 38 extend parallel to one another and are spaced to accommodate a solar collector as will be described hereinafter.

The flashing members 12 and 38 are conveniently formed of metal such as galvanised iron or aluminum and, particularly in the case of flashing members 12, are conveniently produced by a roll forming technique.

The roof assembly further comprises at least one solar energy collector 46 which is generally rectangular in horizontal cross-section. The collector absorber plate, pipe connections, glazing and insulation are of known type and will not be described in detail. However, each side of the collector 46 has a particular configuration which is conveniently produced by roll forming of metal. Each side 48 of the collector 46 includes firstly a downwardly facing groove 50 which includes a narrow neck portion 52. Secondly, each side 48 includes a downwardly facing elongated locating recess 54. The grooves 50 and recesses 54 each extend throughout the length of their respective sides 48.

In use, the flashing strips 12 are placed on the purlins 10 at a suitable spacing such as 1200 mm center to center. The strips 12 are then drilled in the upper surface of the projections 18 and fixing bolts such as 6 mm stainless steelbolts are pressed upwardly through the purlins 10 and the holes in the projections 18. The bolts are retained in place by rubber grommets. The flashing strips 38 are then placed across adjacent pairs of flashing strips 12 at a suitable spacing such as 2 meter centres and pop riveted to the flashing strips 12 by means of the flaps 44.

The collectors 46 are placed so as to rest on top of the flashing strips 12 and 38. Collector pipe connections are made using standard connections which are left finger tight. The collectors 46 are clipped into position by being pressed downwardly so that the resilient portions 34 enter those grooves 50 which are longitudinally disposed. The neck portion 52 of the grooves 50 resiliently engages with the V-section of the downturned portion 36 of the resilient portion 34. In this way the collectors 46 are held in position firmly enough for most situations encountered in use except in cyclonic locations. Simultaneously, the legs 42 at each transverse end of the collector 46 engage with those locating recesses 54 which are transversely disposed. In this way the collectors 46 are located in the position predetermined by the location of the transverse flashing strips 38.

The collector pipe joints are then finally tightened. Next, transverse rubber weather sealing strips 56 are placed between adjacent collectors 46 and tapped into place. Holding down straps (not shown), such as 32 mm × 1.6 mm straps may then be placed over the strips 56 and bolted down using the fixing bolts projecting through the projections 18 and secured by means of nuts. The holding straps are used in cyclonic locations to provide extra security against the extreme weather conditions which may be expected periodically.

The assembly is now water tight. Water can drain down the flashing strips 12 and across the upper surfaces of the collectors 46. Any water which enters through the sealing strips 56 is collected in the flashing strips 38 and drained into the flashing strips 12. Further, all pipe connections to the collector 46 are above the water proof surface and the whole assembly is simply mounted on standard purlins. The pipe joints are accessible for maintenance and can accommodate expansion joints. The assembly accommodates standard size collectors and can be provided with security against cyclonic activity.

As shown, each side of a collector 46 is formed from the same roll formed section. This makes it possible to reduce costs through maximum use of the same component. However, it is clear that the longitudinal sides need only have the grooves 50 while the transverse sides need only have the recesses 54.

For reglazing purposes it is simply necessary to remove the holding down straps and weather sealing strips 56. Then side screws holding glass sealing angles 58 in position are removed followed by the sealing angles 58 themselves. The glass is removed and replaced and the reassembly accomplished in reverse order.

To replace a faulty collector 46, the holding down straps and weather sealing strips 56 at each end of the collector 46 are removed and the holding down straps of the collectors on either side are loosened. The pipe connections to the collector to be replaced are unscrewed. The collector to be replaced is then levered up out of its clipped in location while the adjacent edges of the adjacent collectors are eased up. The faulty collector 46 is removed and replaced and the new collector installed in the manner described above.

Modifications and variations which would be apparent to one skilled in the art are deemed to lie within the scope of the present invention. For example, in locations other than cyclonic areas the fixing bolts and straps are not required and may be replaced by fixing screws 60 drilled through a side of the collector into the longitudinal flashing member 16. Also, instead of the relatively complex profile shown in the drawings, the resilient position 34 could simply be in the form of an outwardly and downwardly turned flange, possibly with a squared or rounded top portion. Further, the neck position 52 in the grooves 50 could be asymmetrical.

I claim:
1. A roof assembly mounted on a sloping roofing structure, comprising
  (a) at least two parallel longitudinal flashing members extending down the slope of and mounted on the roofing structure, each longitudinal flashing member comprising an elongated base having an upstanding wall extending along each major side, and each upstanding wall having a resilient portion at its end remote from said base;

(b) a plurality of transversely extending U-shaped flashing members mounted parallel to one another and connected to adjacent longitudinal flashing members, said U-shaped flashing members being so mounted as to cause any water in them to flow into the longitudinal flashing members to which they are connected;

(c) at least one solar energy collector generally rectangular in horizontal section and having a downwardly facing groove formed in each of two longitudinal sides, a downwardly facing recess formed in each of two transverse sides and means for connection to pipes located above said downwardly facing grooves and recesses;

(d) said at least one solar energy collector being mounted on a pair of said longitudinal flashing members by engagement of each of said downwardly facing grooves with a resilient portion of a said wall of a respective longitudinal flashing member such that said solar energy collector is clipped in place in the said assembly;

(e) said at least one solar energy collector being mounted on a pair of said transverse U-shaped flashing members by engagement of each said downwardly facing recess with a leg of a respective U-shaped flashing member;

(f) the arrangement being such that said at least one solar energy collector and the associated longitudinal and transverse flashing members form a waterproof membrane, and means for connection to pipes of said solar energy collector are located above said waterproof membrane.

2. A roof assembly as claimed in claim 1, wherein said flashing members are mounted on a plurality of transversely extending roof purlins.

3. A roof assembly as claimed in claim 1, wherein each resilient portion of said longitudinal flashing members is integrally formed with its respective wall, is outwardly turned therefrom and terminates in a downwardly turned portion.

4. A roof assembly as claimed in claim 3, wherein each downwardly turned portion includes a longitudinal notch which is in co-operative engagement with a corresponding neck portion in a downwardly facing groove of a solar collector.

5. A roof assembly as claimed in claim 3, wherein each longitudinal flashing strip comprises male and female resilient portions on respective walls so that said longitudinal flashing strips can be clipped together in side by side relation in areas of the roof where there are no solar collectors.

6. A roof assembly as claimed in claim 1, wherein each wall of said longitudinal flashing strip comprises an inward facing longitudinal indentation and said longitudinal flashing strip is laterally secured by clip means, said clip means being attached to said roofing structure and engaging in said indentations.

7. A roof assembly as claimed in claim 1, wherein transverse weather sealing strips are placed between adjacent solar collectors.

8. A roof assembly as claimed in claim 1, wherein hold down straps providing protection for said roof assembly against extreme weather conditions are mounted over the transverse space between solar collectors and over the adjacent transverse edges of said solar collectors, said hold down straps being secured to said longitudinal flashing strips.

* * * * *